US00RE39911E

(19) United States
(12) Reissued Patent
Moskovich

(10) Patent Number: US RE39,911 E
(45) Date of Reissued Patent: Nov. 6, 2007

(54) WIDE FIELD OF VIEW PROJECTION LENSES FOR COMPACT PROJECTION LENS SYSTEMS EMPLOYING PIXELIZED PANELS

(75) Inventor: Jacob Moskovich, Cincinnati, OH (US)

(73) Assignee: 3M Innovative Properties Company, St. Paul, MN (US)

(21) Appl. No.: 10/720,004

(22) PCT Filed: Nov. 10, 1998

(86) PCT No.: PCT/US98/23937

§ 371 (c)(1),
(2), (4) Date: May 10, 2000

(87) PCT Pub. No.: WO99/26090

PCT Pub. Date: May 27, 1999

Related U.S. Patent Documents

Reissue of:
(64) Patent No.: 6,324,014
Issued: Nov. 27, 2001
Appl. No.: 09/554,135
Filed: May 10, 2000

U.S. Applications:
(60) Provisional application No. 60/065,308, filed on Nov. 13, 1997.

(51) Int. Cl.
*G02B 3/00* (2006.01)
*G02B 9/00* (2006.01)

(52) U.S. Cl. ..... 359/651; 359/716; 359/717; 359/649; 359/722; 359/723; 359/691; 353/100; 353/101; 353/122

(58) Field of Classification Search ..... 359/649–651, 359/716, 717, 722, 723, 676, 680, 683, 691, 359/793, 738; 353/100, 101, 122
See application file for complete search history.

(56) References Cited

U.S. PATENT DOCUMENTS

| | | | | | |
|---|---|---|---|---|---|
| 4,189,211 | A | * | 2/1980 | Taylor | 359/663 |
| 4,425,028 | A | * | 1/1984 | Gagnon et al. | 359/246 |
| 4,461,542 | A | * | 7/1984 | Gagnon | 359/495 |
| 4,767,199 | A | * | 8/1988 | Yamamoto et al. | 359/649 |
| 4,778,264 | A | * | 10/1988 | Matsumura et al. | 359/649 |
| 4,801,196 | A | * | 1/1989 | Betensky | 359/649 |
| 4,826,311 | A | * | 5/1989 | Ledebuhr | 353/122 |
| 5,042,929 | A | * | 8/1991 | Tanaka et al. | 359/708 |
| 5,179,473 | A | * | 1/1993 | Yano et al. | 359/691 |
| 5,200,861 | A | * | 4/1993 | Moskovich | 359/662 |

(Continued)

FOREIGN PATENT DOCUMENTS

| | | | |
|---|---|---|---|
| EP | 311116 | * | 4/1989 |
| WO | WO 97/41461 | | 11/1997 |
| WO | WO99/08138 | * | 2/1999 |

OTHER PUBLICATIONS

*The Handbook of Plastic Optics,* U.S. Precision Lens, Inc., Cincinnati, Ohio, 1983, pp. 17–29.*

*Primary Examiner*—Evelyn A. Lester
(74) *Attorney, Agent, or Firm*—George W. Jonas

(57) ABSTRACT

A projection lens for use with LCD panels is provided. The lens has a first lens unit which includes a strong negative lens element having an aspherical surface which provides distortion correction, and a second lens unit which includes a first lens subunit separated by an airspace from a second lens subunit, wherein the first lens subunit has a strong positive power and the second lens subunit has a weaker power. The second lens subunit can include a negative lens element, followed by a positive lens element, followed by a plastic lens element having an aspherical surface. The projection lens has a field of view of at least 35° so that the overall projection lens system has a compact size.

32 Claims, 6 Drawing Sheets

U.S. PATENT DOCUMENTS 5,218,480 A * 6/1993 Moskovich ..... 359/753
5,278,698 A * 1/1994 Iizuka et al. ..... 359/682
5,313,330 A * 5/1994 Betensky ..... 359/676
5,319,495 A * 6/1994 Yamada ..... 359/691
5,331,462 A * 7/1994 Yano ..... 359/689
5,493,446 A * 2/1996 Nakajima ..... 359/650
RE35,310 E * 8/1996 Moskovich ..... 359/649
5,625,495 A * 4/1997 Moskovich ..... 359/663
5,644,435 A * 7/1997 Shikama ..... 359/691
5,666,228 A 9/1997 Yamamoto
5,812,326 A * 9/1998 Yamada ..... 359/749
5,822,128 A * 10/1998 Sekine ..... 359/650
5,822,129 A * 10/1998 Sekine ..... 359/651
5,841,587 A * 11/1998 Moskovich ..... 359/662
5,870,228 A * 2/1999 Kreitzer et al. ..... 359/649
5,900,987 A * 5/1999 Kreitzer ..... 359/649
5,900,989 A * 5/1999 Kreitzer ..... 359/691
5,963,375 A * 10/1999 Kreitzer ..... 359/650
5,969,874 A * 10/1999 Moskovich ..... 359/651
5,969,876 A * 10/1999 Kreitzer et al. ..... 359/651
5,991,089 A * 11/1999 Kreitzer ..... 359/649
6,023,375 A * 2/2000 Kreitzer ..... 359/649
6,509,937 B1 * 1/2003 Moskovich ..... 348/781

* cited by examiner

WIDE FIELD OF VIEW PROJECTION LENSES FOR COMPACT PROJECTION LENS SYSTEMS EMPLOYING PIXELIZED PANELS

Matter enclosed in heavy brackets [ ] appears in the original patent but forms no part of this reissue specification; matter printed in italics indicates the additions made by reissue.

CROSS REFERENCE TO RELATED APPLICATIONS

This is the U.S. national phase of International Application No. PCT/US98/23937 filed Nov. 10, 1998. This application claims the benefit under 35 USC §119(e) of U.S. Provisional Application No. 60/065,308 filed Nov. 13, 1997.

FIELD OF THE INVENTION

This invention relates to projection lenses and, in particular, to projection lenses which can be used, inter alia, to form an image of an object composed of pixels, e.g., a LCD.

BACKGROUND OF THE INVENTION

Projection lens systems (also referred to herein as "projection systems") are used to form an image of an object on a viewing screen. A basic structure of such a system is shown in FIG. 6, wherein 10 is a light source (e.g., a tungsten-halogen lamp), 12 is illumination optics which forms an image of the light source (hereinafter referred to as the "output" of the illumination system), 14 is the object which is to be projected (e.g., a LCD matrix of on and off pixels), and 13 is a projection lens, composed of multiple lens elements, which forms an enlarged image of object 14 on viewing screen 16. The system can also include a field lens, e.g., a Fresnel lens, in the vicinity of the pixelized panel to appropriately locate the exit pupil of the illumination system.

For front projection systems, the viewer will be on the left side of screen 16 in FIG. 6, while for rear projection systems, the viewer will be on the right side of the screen. For rear projection systems which are to be housed in a single cabinet, a mirror is often used to fold the optical path and thus reduce the system's overall size. The projection lenses of the present invention are particularly well suited for use in rear projection systems, but can be used in front projection systems if desired.

Projection lens systems in which the object is a pixelized panel are used in a variety of applications, including data display systems. Such projection lens systems preferably employ a single projection lens which forms an image of, for example, a single panel having red, green, and blue pixels. In some cases, e.g., large image rear projection systems, multiple panels and multiple projection lenses are use, with each panel/projection lens combination producing a portion of the overall image.

Pixelized panels, specifically, LCD panels, come in various sizes depending upon the type of projection system in which they are to be used. Large LCD panels, e.g., panels having a diagonal of about 12.5 inches (about 320 millimeters), can be effectively employed in producing high resolution color images since such panels can have a high pixel count while still maintaining a pixel size which is large enough for reliable manufacture. In this regard, it should be noted that for a full color image from a single LCD panel, the number of pixels needed is three times that required for a monochrome image, thus making for small pixel sizes unless large LCD panels are used.

There exists a need in the art for a projection lens for use with a large pixelized panel which simultaneously has at least the following properties: (1) a wide field of view, i.e., a relatively short focal length; (2) the ability to operate at various magnifications while maintaining a high level of aberration correction; (3) a relatively small size, including a relatively small number of lens elements, a relatively small barrel length, and a relatively small maximum lens diameter; (4) a high level of color correction; (5) low distortion; and (6) low sensitivity to temperature changes.

A wide field of view allows the overall projection lens system to be compact which is highly desirable for installations where space is at a premium. In particular, compactness minimizes the size and thus cost of the cabinetry needed to house the projection system and facilities packing and shipping of the finished system to the user.

A projection lens which can efficiently operate at various magnifications is desirable since it allows the projection system to be used with screens of different sizes without the need to change any of the components of the system. Only the object and image conjugates need to be changed which can be readily accomplished by moving the lens relative to the pixelized panel. The challenge, of course, is to provide a high level of aberration correction throughout the operative range of magnifications.

A relatively small projection lens is desirable from a cost, weight, and size point of view. Large numbers of lens elements and elements having large diameters consume more raw materials, weigh more, and are more expensive to build and mount. Long barrel lengths normally increase the overall size of the projection system, which again leads to increased cost and weight. Accordingly, a lens with a minimum number of relatively small lens elements, located relatively close to one another, is desired.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the pixelized panel, should be better than about a pixel and, preferably, better than about a half a pixel to avoid these problems.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion.

This is so because good image quality is required even at the extreme points of the field of view of the lens when viewing data. As will be evident, an undistorted image of a displayed number or letter is just as important at the edge of the field as it is at the center.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen. In particular, as illustrated by the examples presented below, the lenses of the invention can, for example, have a field of view of up to ±45°, can operate at f/4, and can have a magnification range of 5.5× to 9.6×.

DESCRIPTION OF THE PRIOR ART

Projection lenses for use with pixelized panels are described in various patents including Taylor, U.S. Pat. Nos. 4,189,211, Tanaka et al., 5,042,929, Yano et al., 5,179,473, Moskovich, 5,200,861, Moskovich, 5,218,480, Iizuka et al., 5,278,698, Betensky, 5,313,330, and Yano, 5,331,462.

Discussions of LCD systems can be found in Gagnon et al., U.S. Pat. Nos. 4,425,028, Gagnon, 4,461,542, Ledebuhr, 4,826,311, and EPO Patent Publication No. 311,116.

SUMMARY OF THE INVENTION

In view of the foregoing, it is an object of the present invention to provide improved projection lenses for use with pixelized panels which simultaneously have each of the six desired properties discussed above. This object is achieved by means of a projection lens which has a focal length f0 and consists in order from its image side to its object side (i.e., from its long conjugate side to its short conjugate side) of:

(A) a first lens unit (U1) having a focal length f1 and comprising:
  (i) a lens element (E1) having a focal length $f_{E1}$; and
  (ii) at least one aspherical surface for correction of distortion; and (B) a second lens unit (U2) having a focal length f2 and consisting in order from the image side of:
  (i) a first lens subunit ($U2_{S1}$) having a focal length $f2_{S1}$; and
  (ii) a second lens subunit ($U2_{S2}$) separated from the first lens subunit by an airspace ($t_{S1S2}$) and having a focal length $f2_{S2}$, said second lens subunit comprising: (a) at least one aspherical surface for correction of spherical aberration, and (b) means for providing axial color correction and the lens system;

wherein:

$$|f1|/f0 > 0.75;$$
$$f_{E1} < 0;$$
$$f2 > 0;$$
$$f2/f0 < 2.0;$$
$$f2_{S1} > 0;$$
$$f2_{S1} < 1.5; \text{ and}$$
$$|f2_{S2}|/f0 > 1.5.$$

In certain preferred embodiments, the lens system also satisfies some or all of the following relationships:

$$|f_{E1}|/f0 < 1.5; \text{ and}$$
$$t_{S1S2}|/f0 > 0.1.$$

In other preferred embodiments, the second lens subunit comprises in order from the image side a negative lens element, a positive lens element, and a plastic lens element having at least one aspherical surface. The plastic lens element with the aspherical surface can have a positive or negative on-axis power. This arrangement facilitates athermalization and manufacture of the lens system.

In further preferred embodiments, the semi-field of view of the projection lens is larger than 35°. In this way, the projection lens system can have an overall compact size. The clear apertures of the first and second lens units also contribute to the overall compactness of the system, with the clear aperture of the first lens unit preferably being greater than the clear aperture of the second lens unit. Preferably, the clear aperture of the first lens unit is less than 0.7 times the diagonal of the pixelized panel. Examples 1–3 presented below have semi-fields of view greater than 35° and have first lens units whose maximum clear aperture is less than 0.7 times the diagonal of the pixelized panel for a pixelized panel having a diagonal of 12.5 inches.

Variation in the magnification of the projection lens system is preferably achieved by varying: (a) the distance between the projection lens and the pixelized panel and (b) the distance between the first and second lens units. In particular, the first and second lens units both move in the same direction relative to the pixelized panel for focusing, but at different rates so that the distance between those units changes as the lens system is focused for different magnifications.

The projection lenses of the invention are preferably designed to be substantially athermal. As discussed fully below, this is done by a combination of selecting the locations for and balancing the powers of the plastic lens elements having substantial optical power.

BRIEF DESCRIPTION OF THE DRAWINGS

FIGS. 4 and 5 are MTF plots for screen-to-panel magnifications of −0.182 and −0.104, respectively. The left panels of these plots show through focus data and the right panels show at focus versus frequency data. Dotted lines represent PHASE data, dashed lines represent SAG data, and solid lines represent TAN data. The focal length, f/number, and focus position for FIG. 4 are 178.81, 4.00, and 0.094, respectively. The focal length, f/number, and focus position for FIG. 5 are 170.48, 4.00, and −0.023, respectively.

Figure 1:
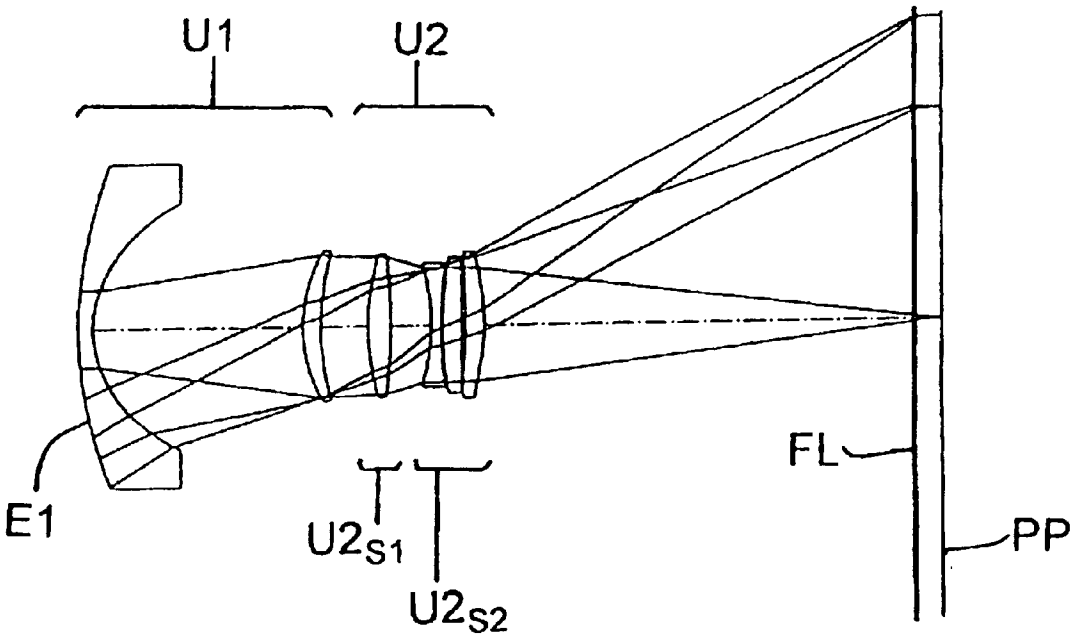
FIGS. 1–3 are schematic side views of projection lenses constructed in accordance with the invention in combination with a pixelized panel (PP) and a Fresnel lens (FL).

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the lens systems of the present invention are used to image pixelized panels, e.g., large size LCD panels, in a compact set-up and, as such, must provide a wide field of view while maintaining a very good correction of distortion. The lens systems are also intended to be used over a wide range of conjugates and, therefore, must correct for aberrations in such a way that the aberrations do not vary (increase) to any significant extent with changes in the magnification at which the lens operates.

To achieve these goals, a wide field of view retrofocus type lens system is used. The lens system consists of two lens units—a weaker power first (front) lens unit (U1) on the long conjugate side of the lens system and a strong positive power second (rear) lens unit (U2) on the short conjugate side of the system. The second lens unit, in turn, consists of two lens subunits, a first (front) lens unit on the long conjugate side of the system and a second (rear) lens unit on the short conjugate side.

Important characteristics of these units and subunits are as follows:

(1) The first unit contains an aspherical surface to provide a necessary level of correction of distortion. As discussed above, the system's distortion needs to be highly corrected for lens systems used with pixelized panels. The distortion correction of the lens systems of the present invention is generally better than about one percent at the image, and preferably better than about 0.5 percent.

(2) The second unit provides most of the power of the lens system. In this way, the overall length of the lens system as a whole can be reduced.

(3) The rear subunit of the second unit includes an aspherical surface which provides correction of spherical aberration.

(4) Both units move for focusing in the same direction but at different rates of motion to provide a very stable correction of astigmatism at various imaging conjugates.

(5) To lower the overall cost of the lens system, aspherical elements are made out of optical plastic materials.

For purposes of color correction, the second lens subunit includes axial color correcting means. Various means for correcting axial color known in the art can be used. A preferred approach comprises including a negative lens element composed of a high dispersion material and at least one positive lens element composed of a low dispersion material in the second lens subunit. The high and low dispersion materials can be glass or plastic.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See The Handbook of Plastic Optics, U.S. Precision Lens, Inc., Cincinnati, Ohio, 1983, pages 17–29.

As discussed above, the projection lenses of the invention are athermalized so that the optical performance of the system, including, in particular, the system's back focal length, does not substantially change as the projection lens is heated from room temperature to its operating temperature. More specifically, the change in the back focal length is preferably less than an amount which will significantly change the modulation transfer function (MTF) of the system, e.g., the change in the MTF at 3 cycles per millimeter should be less than about 10 percent. For the specific examples presented below, this MTF criterion corresponds to a change in the back focal length of less than about ±0.4 millimeters. The desired thermal stabilization of the lens' focus is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use at least some plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by taking into account the location and power of the plastic lens elements, as well as the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 2:
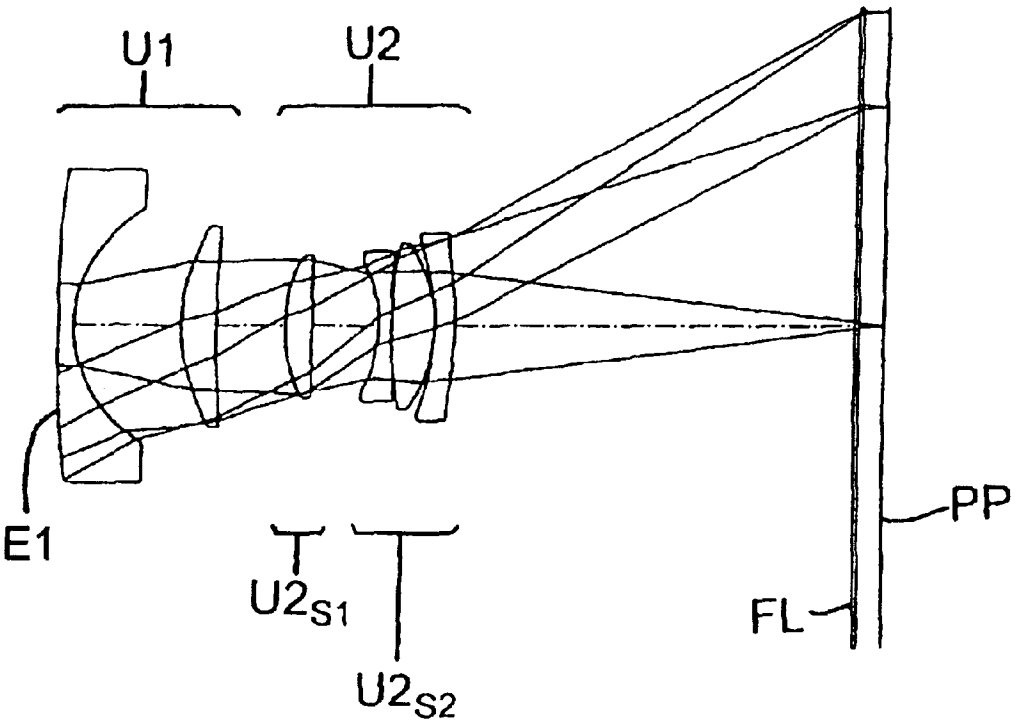
Figure 3:
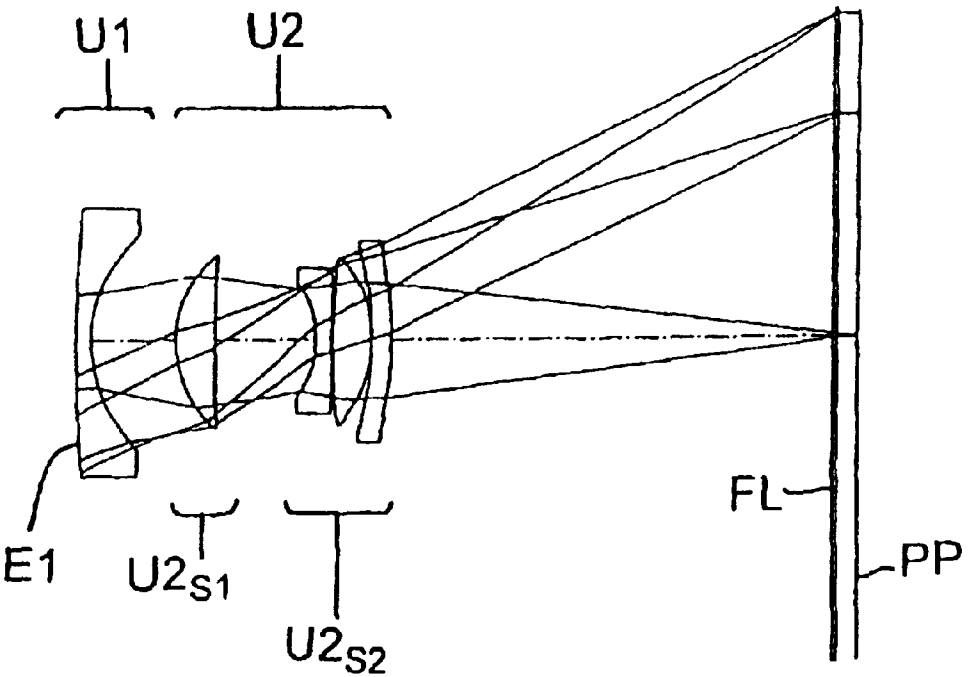

FIGS. 1 to 3 illustrate various projection lenses constructed in accordance with the invention. Corresponding prescriptions and optical properties appear in Tables 1 to 3, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1 + k)c^2y^2]^{\frac{1}{2}}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–3.

The "First-Order Data" reported in Tables 1–3 was calculated with the Fresnel lens as part of the system. The designation "a" associated with various surfaces in the tables represents an aspheric surface, i.e., a surface for which at least one of D, E, F, G, H, or I in the above equation is not zero; the designation "c" indicates a surface for which "k" in the above equation is not zero; and the designation "f" indicates a Fresnel lens. All dimensions given in the tables are in millimeters.

The tables are constructed on the assumption that light travels from left to right in the figures. In actual practice, the viewing screen will be on the left and the pixelized panel will be on the right, and light will travel from right to left. The pixelized panel is shown in FIGS. 1–3 by the designation "PP" and the Fresnel lens associated with the pixelized panel is shown by the designation "FL". The Fresnel lens serves to match the light source with the entrance pupil (exit pupil in the tables) of the projection lens.

As discussed above, the projection lenses of FIGS. 1–3 can be focused over a large conjugate range by varying the distance between the first and second lens units in conjunction with moving the entire lens relative to the pixelized panel. As shown in Tables 1—3, the movement of the first lens unit relative to the second lens unit is in general small compared to the overall movement of the lens system relative to the pixelized panel.

The correspondence between the surface numbers of Tables 1–3 and the U1, E1, U2, U2$_{S1}$, U2$_{S2}$, and FL terminology discussed above is set forth in Table 4.

Table 5 summarizes various properties of the lens systems of the invention. As can be seen from this table, the lens systems of the examples satisfy the limitations set forth above regarding the focal lengths of the various lens units, subunits, and elements, as well as the limitation on the spacing ($t_{S1,S2}$) between the subunits of the second lens unit.

Under the heading "PP22", Table 5 lists the location of the rear principal point of the second lens unit relative to the rear surface of that unit. A comparison of these values with the prescriptions of Tables 1–3 shows that the rear principal point of this unit is located well ahead of the second subunit. This distinguishes the second lens unit of the lenses of the present invention from a classical triplet for which the rear principal point would be located in the middle of the unit.

Figure 4:
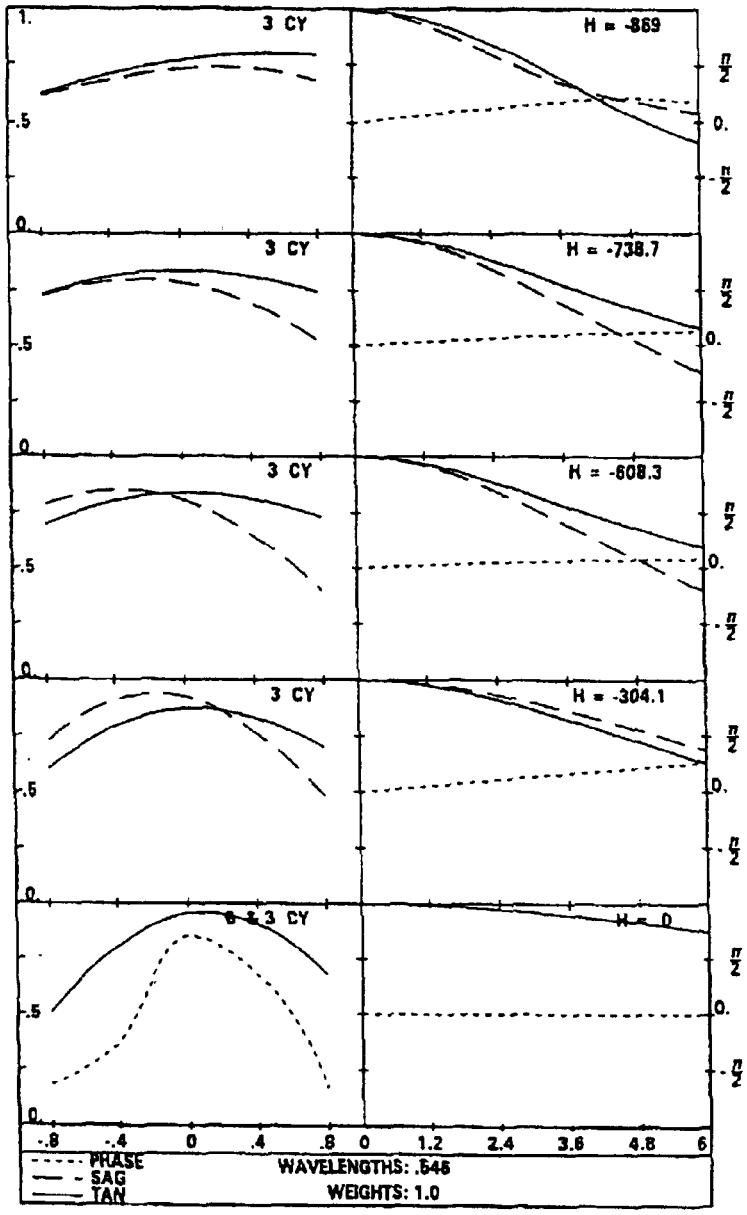
FIGS. 4 and 5 are monochromatic optical transfer function (MTF) plots for the lens system of FIG. 1 for an object (pixelized panel) height of 158 millimeters for both figures and an image (screen) height of −869 millimeters for FIG. 4 and −1524 millimeters for FIG. 5, i.e.
Figure 5:
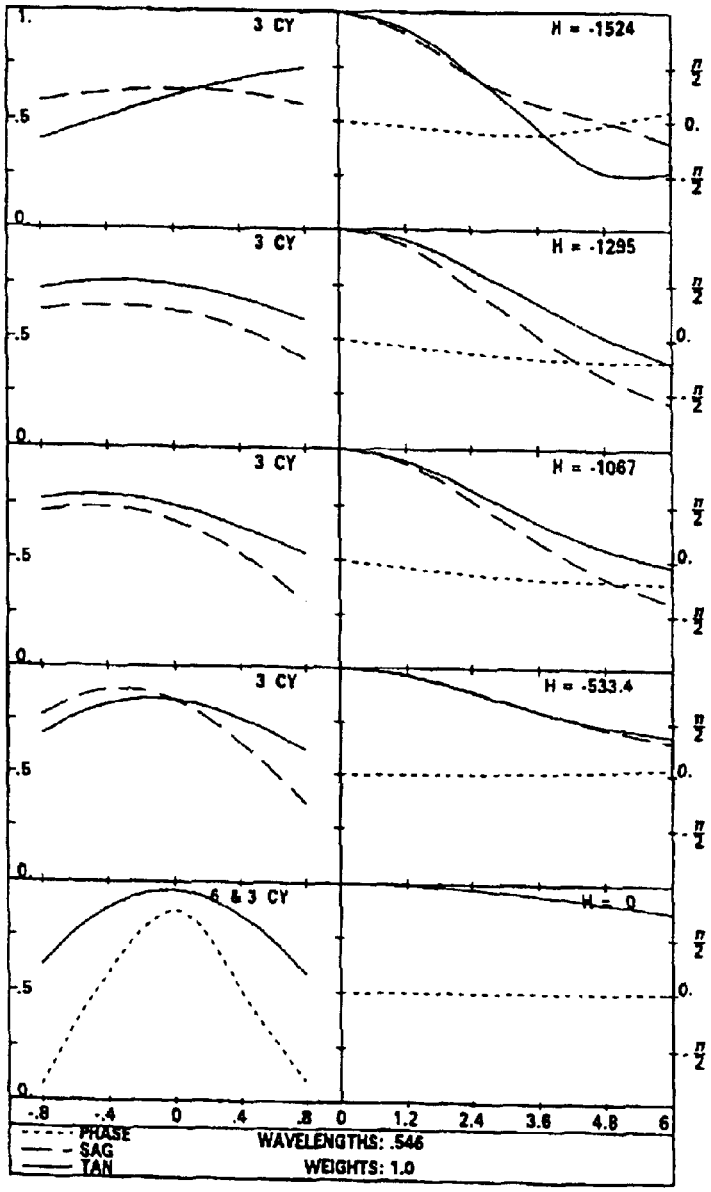
Figure 6:
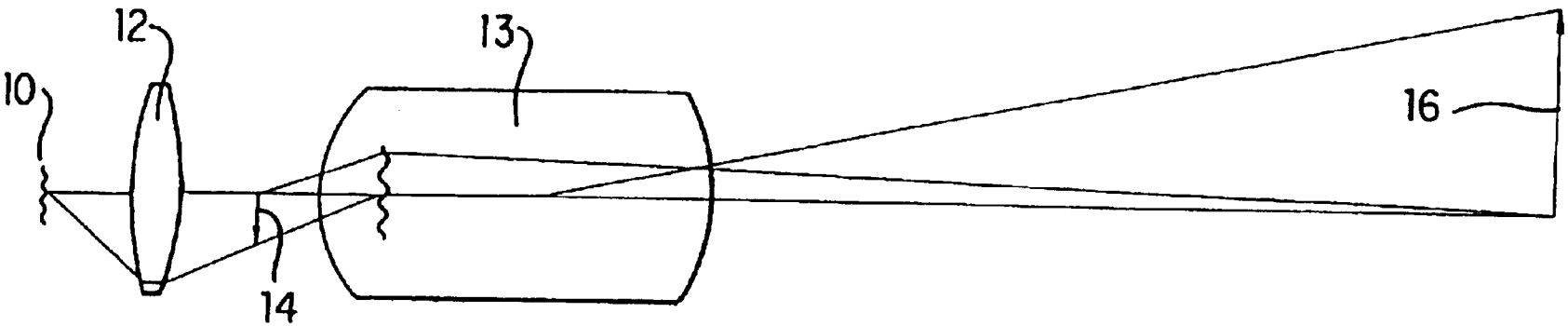
FIG. 6 is a schematic diagram showing an overall projection lens system in which the projection lens of the present invention can be used.

The plots of FIGS. 4 and 5 show the through-focus MTF on the left and the MTF at best axial focus on the right for the lens system of FIG. 1 operating at screen-to-pixelized panel magnifications of −0.182 and −0.104, respectively. Data is shown for five field points, namely, on axis and 35, 70, 85 and 100 percent of maximum field height. The actual field heights at the viewing screen are shown for the right hand plots. These field heights apply to both the right hand and left hand plots and are in millimeters.

The through-focus data are at the indicated spatial frequency in cycles per millimeter. Both the through-focus and best-focus data indicate tangential and sagittal (dashed curves) MTF. The modulus scale is on the left of each block and runs from zero to one. The phase of the MTF is shown as a dotted curve in the best-focus plots. The scale for the phase is indicated on the right of each best-focus block and is in radian measure. All the MTF data are for a wavelength of 546.1 nanometers. The axial focus shift indicated above the best-focus plots is relative to the zero position of the through-focus plots. The best-focus plane is at the peak of the axial through-focus plot.

The lens systems of FIGS. 2 and 3 have similar MTF plots to those of FIGS. 4 and 5 over the same magnification ranges. These figures illustrate that the lens systems of the present invention achieve high levels of aberration control over a wide range of magnifications as is necessary for a projection lens system which is to be used with a pixelized panel.

The lenses of FIGS. 1–3 were designed for use with LCD panels having a diagonal of about 12.5 inches (about 320 millimeters). The panels have a pixel size of 200 microns, corresponding to over 1,000 TV lines of horizontal resolution. The images of the panels produced by the lenses of the invention typically range from about 36 inches (about 900 millimeters) to about 60 inches (about 1,500 millimeters). Significantly, the lenses achieve extremely good chromatic correction to the order of a quarter pixel (50 microns) or less. This is an extremely important feature for high quality data or video projection.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 194.8286 | 8.00000 | ACRYLIC | 170.25 |
| 2 | c | 60.4976 | 109.75660 | | 126.07 |
| 3 | | 75.1853 | 10.00000 | LLF1 | 76.48 |
| 4 | | 136.8907 | Space 1 | | 74.90 |
| 5 | | Aperture stop | 0.00000 | | 73.02 |
| 6 | | 129.0860 | 12.00000 | SK18 | 72.82 |
| 7 | | −344.4271 | 21.99035 | | 71.59 |
| 8 | | −108.0986 | 5.00000 | SF10 | 61.54 |
| 9 | | 205.3792 | 1.00000 | | 62.92 |
| 10 | | 201.2503 | 10.00000 | SK18 | 64.24 |
| 11 | | ∞ | 1.96305 | | 69.18 |
| 12 | a | −394.4647 | 10.00000 | ACRYLIC | 70.32 |
| 13 | a | −100.0000 | Space 2 | | 74.84 |
| 14 | | ∞ | 2.00000 | ACRYLIC | 320.00 |
| 15 | acf | −145.1760 | Image distance | | 320.00 |

Symbol Description a—Polynomial asphere
c—Conic section
f—Fresnel

Conics

| Surface Number | Constant |
|---|---|
| 2 | −4.1664E−01 |
| 15 | −1.0000E+00 |

Even Polynomial Aspheres

| Surf. No. | D | E | F | G | H | I |
|---|---|---|---|---|---|---|
| 1 | −6.0946E−08 | 2.5026E−12 | −4.2474E−16 | 5.0369E−20 | −4.4208E−24 | 1.6693E−28 |
| 12 | 6.0712E−08 | 2.0076E−10 | 7.2384E−14 | −7.5148E−17 | 5.4549E−20 | −1.6468E−23 |
| 13 | 5.5349E−07 | 3.8742E−10 | −1.5666E−14 | 1.3171E−17 | 1.3083E−20 | −9.0221E−24 |
| 15 | −3.5550E−09 | 1.5454E−14 | −4.2142E−20 | 0.0000E+00 | 0.0000E+00 | 0.0000E+00 |

Variable Spaces

| Focus Pos. | Space 1 T(4) | Space 2 T(13) | Focal Shift | Image Distance |
|---|---|---|---|---|
| 1 | 25.031 | 227.354 | −1.830 | 12.573 |
| 2 | 26.294 | 213.849 | −1.514 | 12.566 |

First-Order Data

| | | |
|---|---|---|
| f/number | 4.00 | 4.00 |
| Magnification | −0.1818 | −0.1037 |
| Object Height | −869.00 | −1524.0 |
| Object Distance | −900.14 | −1565.2 |
| Effective Focal Length | 178.81 | 170.48 |
| Image Distance | 12.573 | 12.566 |
| Overall Length | 1356.8 | 2009.7 |
| Forward Vertex Distance | 456.67 | 444.42 |
| Barrel Length | 444.10 | 431.85 |
| Stop Surface Number | 5 | 5 |
| Distance to Stop | 0.00 | 0.00 |
| Stop Diameter | 73.024 | 69.240 |

TABLE 1-continued

| | | |
|---|---|---|
| Entrance Pupil Distance | 88.419 | 88.943 |
| Exit Pupil Distance | −6246.4 | −2940.9 |

First Order Properties of Elements

| Element Number | Surface Numbers | | Power | f' | lpp | l'pp |
|---|---|---|---|---|---|---|
| 1 | 1 | 2 | −0.55002E−02 | −181.81 | 7.9311 | 2.4627 |
| 2 | 3 | 4 | 0.34935E−02 | 286.24 | −7.4284 | −13.525 |
| 3 | 6 | 7 | 0.67621E−02 | 147.88 | 2.0131 | −5.3714 |
| 4 | 8 | 9 | −0.10438E−01 | −95.802 | 0.9875 | −1.8762 |
| 5 | 10 | 11 | 0.31865E−02 | 313.82 | −0.38351E−08 | −6.0928 |
| 6 | 12 | 13 | 0.37160E−02 | 269.11 | 8.8774 | 2.2505 |
| 7 | 14 | 15 | 0.34012E−02 | 294.01 | 1.3389 | −0.97909E−07 |

First Order Properties of Groups

| Group Number | Surface Numbers | | Power | f' | lpp | l'pp |
|---|---|---|---|---|---|---|
| 1 | 1 | 4 | −0.87724E−04 | −11399. | −3969.1 | −6275.0 |
| 2 | 5 | 13 | 0.38798E−02 | 257.74 | 2.1688 | −49.915 |
| 3 | 14 | 15 | 0.34012E−02 | 294.01 | 1.3389 | −0.97909E−07 |

First Order Properties of the Lens

| Focus Position Number | Power | f' | lpp | l'pp |
|---|---|---|---|---|
| 1 | 0.55926E−02 | 178.81 | 262.09 | −196.91 |
| 2 | 0.5865BE−02 | 170.48 | 249.53 | −174.08 |

TABLE 2

| Surf. No. | Type | Radius | Thickness | Glass | Clear Aperture Diameter |
|---|---|---|---|---|---|
| 1 | a | 27156.6506 | 8.00000 | ACRYLIC | 156.13 |
| 2 | c | 61.4019 | 54.48984 | | 113.69 |
| 3 | a | 83.5640 | 18.00000 | ACRYLIC | 98.61 |
| 4 | | 592.1970 | Space 1 | | 95.06 |
| 5 | a | 106.4909 | 13.00000 | ACRYLIC | 68.99 |
| 6 | a | −612.1763 | 18.45447 | | 66.62 |
| 7 | | Aperture stop | 16.00000 | | 58.25 |
| 8 | a | −79.7997 | 6.00000 | STYRENE | 61.03 |
| 9 | c | 277.3432 | 0.75000 | | 73.29 |
| 10 | | 230.4632 | 21.00000 | SK5 | 76.92 |
| 11 | | −74.6603 | 0.50000 | | 81.37 |
| 12 | a | −104.7869 | 10.00000 | ACRYLIC | 84.05 |
| 13 | a | −175.5202 | Space 2 | | 91.82 |
| 14 | | ∞ | 2.00000 | ACRYLIC | 315.00 |
| 15 | acf | −145.1760 | Image distance | | 316.34 |

Symbol Description a—Polynomial asphere
c—Conic section
f—Fresnel

Conics

| Surface Number | Constant |
|---|---|
| 2 | −2.9168E−01 |
| 9 | −9.7917E+01 |
| 15 | −1.0000E+00 |

Even Polynomial Aspheres

| Surf. No. | D | E | F | G | H | I |
|---|---|---|---|---|---|---|
| 1 | 2.3908E−07 | −3.4397E−11 | 2.4621E−15 | 1.2648E−19 | −4.0977E−23 | 2.2303E−27 |
| 3 | −3.8129E−07 | 3.9533E−12 | −8.4237E−15 | 2.2693E−18 | 3.7384E−22 | −3.6138E−26 |

TABLE 2-continued

| | | | | | | |
|---|---|---|---|---|---|---|
| 5 | 9.8098E−07 | 2.6109E−10 | 2.0807E−14 | 4.2367E−17 | 1.6288E−20 | −2.4869E−23 |
| 6 | 5.9783E−07 | 1.3543E−12 | 1.7372E−13 | −4.5067E−17 | −4.4564E−20 | −3.1331E−25 |
| 8 | −1.3838E−06 | 1.5573E−11 | −5.1429E−13 | −6.8140E−17 | 2.9291E−19 | −2.4056E−22 |
| 12 | 2.0475E−07 | 4.6005E−11 | 4.2151E−14 | −7.1866E−19 | −5.4839E−21 | 1.0257E−24 |
| 13 | 3.5125E−07 | 7.9683E−11 | 9.2083E−15 | −3.2327E−18 | 1.6141E−22 | 8.8822E−26 |
| 15 | −3.5550E−09 | 1.5454E−14 | −4.2142E−20 | 0.0000E+00 | 0.0000E+00 | 0.0000E+00 |

Variable Spaces

| Focus Pos. | Space 1 T(4) | Space 2 T(13) | Focal Shift | Image Distance |
|---|---|---|---|---|
| 1 | 34.327 | 207.009 | −0.823 | 12.493 |
| 2 | 35.479 | 193.765 | −0.539 | 12.492 |

First-Order Data

| | | |
|---|---|---|
| f/number | 4.00 | 4.00 |
| Magnification | −0.1818 | −0.1037 |
| Object Height | −869.00 | −1524.0 |
| Object Distance | −900.01 | −1553.1 |
| Effective Focal Length | 175.49 | 167.37 |
| Image Distance | 12.493 | 12.492 |
| Overall Length | 1322.0 | 1963.0 |
| Forward Vertex Distance | 422.02 | 409.93 |
| Barrel Length | 409.53 | 397.44 |
| Stop Surface Number | 7 | 7 |
| Distance to Stop | 0.00 | 0.00 |
| Stop Diameter | 57.578 | 54.700 |
| Entrance Pupil Distance | 80.298 | 80.825 |
| Exit Pupil Distance | −2056.5 | −1434.2 |

First Order Properties of Elements

| Element Number | Surface Numbers | Power | f' | lpp | l'pp |
|---|---|---|---|---|---|
| 1 | 1 2 | −0.79984E−02 | −125.03 | 5.3736 | 0.12150E−01 |
| 2 | 3 4 | 0.51188E−02 | 195.36 | −1.9588 | −13.882 |
| 3 | 5 6 | 0.53945E−02 | 185.38 | 1.2986 | −7.4652 |
| 4 | 8 9 | −0.96608E−02 | −103.51 | 0.83532 | −2.9031 |
| 5 | 10 11 | 0.10219E−01 | 97.852 | 10.229 | −3.3136 |
| 6 | 12 13 | 0.18049E−02 | −554.04 | −10.413 | −17.442 |
| 7 | 14 15 | 0.34012E−02 | 294.01 | 1.3389 | −0.97909E−07 |

First Order Properties of Groups

| Group Number | Surface Numbers | Power | f' | lpp | l'pp |
|---|---|---|---|---|---|
| 1 | 1 4 | −0.72934E−03 | −1371.1 | −363.23 | −589.84 |
| 2 | 5 13 | 0.46009E−02 | 217.35 | 27.600 | −52.653 |
| 3 | 14 15 | 0.34012E−02 | 294.01 | 1.3389 | −0.97909E−07 |

First Order Properties of the Lens

| Focus Position Number | Power | f' | lpp | l'pp |
|---|---|---|---|---|
| 1 | 0.56983E−02 | 175.49 | 240.68 | −194.08 |
| 2 | 0.59746E−02 | 167.37 | 228.61 | −171.70 |

TABLE 3

| Surf. No. | Type | Radius | Thickness | Glass | Clear Aperture Diameter |
|---|---|---|---|---|---|
| 1 | a | 773.3177 | 8.00000 | ACRYLIC | 131.34 |
| 2 | a | 68.8038 | Space 1 | | 104.97 |
| 3 | a | 57.5756 | 20.00000 | ACRYLIC | 85.07 |
| 4 | | 43000.3193 | 33.11847 | | 83.24 |
| 5 | | Aperture stop | 18.00000 | | 54.39 |
| 6 | a | −51.0808 | 8.00000 | STYRENE | 55.33 |
| 7 | | 20188.0991 | 0.75000 | | 71.92 |
| 8 | | 399.4017 | 20.00000 | SK18 | 83.61 |
| 9 | | −62.2385 | 0.50000 | | 84.84 |

TABLE 3-continued

| | | | | | |
|---|---|---|---|---|---|
| 10 | | −144.3189 | 10.00000 | ACRYLIC | 91.68 |
| 11 | a | −162.3311 | Space 2 | | 99.98 |
| 12 | | ∞ | 2.00000 | ACRYLIC | 324.96 |
| 13 | acf | −145.1760 | Image distance | | 326.20 |

Symbol Description a—Polynomial asphere
c—Conic section
f—Fresnel

Conics

| Surface Number | Constant |
|---|---|
| 13 | −1.0000E+00 |

Even Polynomial Aspheres

| Surf. No. | D | E | F | G | H | I |
|---|---|---|---|---|---|---|
| 1 | 2.8065E−08 | −9.5802E−12 | 3.4911E−15 | 3.8405E−19 | −1.1330E−22 | 1.8634E−26 |
| 2 | −1.1685E−07 | −1.3373E−10 | 5.3413E−14 | −6.7212E−18 | −5.2030E−21 | 9.4262E−25 |
| 3 | 6.3109E−09 | −9.3902E−12 | 6.7268E−14 | −8.4753E−18 | −1.4957E−20 | 5.9849E−24 |
| 4 | 2.9658E−07 | 8.8683E−11 | −2.7028E−14 | −1.8565E−17 | 1.6503E−20 | −3.2817E−24 |
| 6 | −7.5920E−07 | 3.0930E−10 | −1.9499E−12 | 7.5804E−16 | 1.3124E−18 | −1.2617E−21 |
| 11 | 2.0900E−07 | 4.8660E−11 | 2.4565E−14 | −1.5910E−17 | 5.0824E−21 | −5.0813E−25 |
| 13 | −3.5550E−09 | 1.5454E−14 | −4.2142E−20 | 0.0000E+00 | 0.0000E+00 | 0.0000E+00 |

Variable Spaces

| Focus Pos. | Space 1 T(4) | Space 2 T(13) | Focal Shift | Image Distance |
|---|---|---|---|---|
| 1 | 41.972 | 223.883 | −2.707 | 9.996 |
| 2 | 38.104 | 217.390 | −1.499 | 9.996 |

First-Order Data

| | | |
|---|---|---|
| f/number | 4.02 | 4.02 |
| Magnification | −0.1805 | −0.1066 |
| Object Height | −900.58 | −1524.0 |
| Object Distance | −1057.8 | −1827.7 |
| Effective Focal Length | 203.28 | 201.65 |
| Image Distance | 9.9964 | 9.9964 |
| Overall Length | 1454.0 | 2213.6 |
| Forward Vertex Distance | 396.22 | 385.86 |
| Barrel Length | 386.22 | 375.86 |
| Stop Surface Number | 5 | 5 |
| Distance to Stop | 0.00 | 0.00 |
| Stop Diameter | 54.392 | 53.125 |
| Entrance Pupil Distance | 72.868 | 71.621 |
| Exit Pupil Distance | −9386.3 | −5310.9 |

First Order Properties of Elements

| Element Number | Surface Numbers | Power | f' | lpp | l'pp |
|---|---|---|---|---|---|
| 1 | 1 2 | −0.65135E−02 | −153.53 | 5.9007 | 0.52500 |
| 2 | 3 4 | 0.85660E−02 | 116.74 | −0.17948E−01 | −13.405 |
| 3 | 6 7 | −0.11678E−01 | −85.628 | 0.12657E−01 | −5.0024 |
| 4 | 8 9 | 0.11708E−01 | 85.414 | 10.724 | −1.6712 |
| 5 | 10 11 | −0.30997E−03 | −3226.1 | −65.694 | −73.893 |
| 6 | 12 13 | 0.34012E−02 | 294.01 | 1.3389 | −0.97909E−07 |

First Order Properties of Groups

| Group Number | Surface Numbers | Power | f' | lpp | l'pp |
|---|---|---|---|---|---|
| 1 | 1 2 | −0.65135E−02 | −153.53 | 5.9007 | 0.52500 |
| 2 | 3 11 | 0.76563E−02 | 130.61 | 42.328 | −87.465 |
| 3 | 12 13 | 0.34012E−02 | 294.01 | 1.3389 | −0.97909E−07 |

TABLE 3-continued

| Focus Position Number | First Order Properties of the Lens | | | |
|---|---|---|---|---|
| | Power | f' | lpp | l'pp |
| 1 | 0.49192E−02 | 203.28 | 271.74 | −227.27 |
| 2 | 0.49590E−02 | 201.65 | 265.60 | −211.65 |

TABLE 4

| Ex. No. | Front Unit (U1) | Strong Negative Element (E1) | Rear Unit (U2) | Front Subunit ($U2_{S1}$) | Rear Subunit ($U2_{S2}$) | Fresnel Lens (FI) |
|---|---|---|---|---|---|---|
| 1 | 1 to 4 | 1 to 2 | 6 to 13 | 6 to 7 | 8 to 13 | 14 to 15 |
| 2 | 1 to 4 | 1 to 2 | 5 to 13 | 5 to 6 | 8 to 13 | 14 to 15 |
| 3 | 1 to 2 | 1 to 2 | 3 to 11 | 3 to 4 | 6 to 11 | 12 to 13 |

TABLE 5

| Ex. No. | f0* | f1 | $f_{E1}$ | f2 | $f2_{S1}$ | $f2_{S2}$ | PP22 | $t_{S1S2}$ | f3 |
|---|---|---|---|---|---|---|---|---|---|
| 1 | 168.4 | −11399.00 | −181.81 | 257.74 | 147.88 | −347.44 | −49.92 | 21.99 | 294.01 |
| 2 | 165.1 | −1371.10 | −125.03 | 217.35 | 185.38 | −7102.83 | −52.65 | 34.45 | 294.01 |
| 3 | 187.9 | −153.53 | −153.53 | 130.61 | 116.74 | 535.47 | −87.47 | 51.12 | 294.01 |

*The f0 values listed in this table do not include the Fresnel lens (f3). The corresponding values including the Fresnel lens are 178.81, 175.49, and 203.28 for Examples 1, 2, and 3 respectively.

What is claimed is:

1. A projection lens for forming an image of an object, said projection lens having a focal length f0 and consisting in order from its image side of:

(A) a first lens unit having a focal length f1 and comprising[: (i)] a lens element having a focal length $f_{E1}$, [; and] *said lens element comprising* [(ii)] at least one aspherical surface for correction of distortion; and (B) a second lens unit having a focal length f2 and consisting in order from its image side of:

(i) a first lens subunit having a focal length $f2_{S1}$; and (ii) a second lens subunit separated from the first lens subunit by an airspace and having a focal length $f2_{S2}$, said second lens subunit comprising: (a) at least one aspherical surface for correction of spherical aberration, and (b) means for providing axial color correction for the lens system;

wherein:

$$|f1|/f0 > 0.75;$$
$$f_{E1} < 0;$$
$$f2 > 0;$$
$$f2/f0 < 2.0$$
$$f2_{S1} > 0;$$
$$f2_{S1}/f0 < 1.5; \text{ and}$$
$$|f2_{S2}|/f0 < 1.5.$$

2. A projection lens for forming an image of an object, said projection lens having a focal length f0 and consisting in order from its image side of:

(A) a first lens unit having a focal length f1 and comprising:

(i) a lens element having a focal length $f_{E1}$; and (ii) at least one aspherical surface for correction of distortion; and (B) a second lens unit having a focal length f2 and consisting in order from its image side of:

(i) a first lens subunit having a focal length $f2_{S1}$; and (ii) a second lens subunit separated from the first lens subunit by an airspace and having a focal length $f2_{S2}$, said second lens subunit consisting in order from its image side of: (a) a negative lens element, (b) a positive lens element, and (c) a plastic lens element having at least one aspherical surface;

wherein:

$$|f1|/f0 > 0.75;$$
$$f_{E1} < 0;$$
$$f2 > 0;$$
$$f2/f0 < 2.0;$$
$$f2_{S1} > 0;$$
$$f2_{S1}/f0 < 1.5; \text{ and}$$
$$|f2_{S2}|/f0 > 1.5.$$

3. The projection lens of claim 2 wherein the plastic lens element of the second lens subunit has a positive on-axis power.

4. The projection lens of claim 2 wherein the plastic lens element of the second lens subunit has a negative on-axis power.

5. The projection lens of claim 2 wherein the negative lens element of the second lens subunit has a higher dispersion than the positive lens element of the second lens subunit.

6. The projection lens of claim 1 or 2 wherein:

$$|f_{E1}|/f0<1.5.$$

7. The projection lens of claim 1 or 2 wherein:

$$t_{S1S2}/f0>0.1,$$

where $t_{S1S2}$ is the length of the airspace between the first and second lens subunits.

8. The projection lens of claim 1 or 2 wherein the lens has a half field of view in the direction of the image of at least 35°.

9. The projection lens of claim 1 or 2 wherein the maximum clear aperture of the first lens unit is greater than the maximum clear aperture of the second lens unit.

10. The projection lens of claim 1 or 2 wherein the second lens unit has a rear principal point which is located ahead of the image end of the second lens subunit.

11. The projection lens of claim 1 or 2 wherein the lens has a distortion which is less than one percent at the image.

12. The projection lens of claim 1 or 2 wherein the object is a pixelized panel.

13. The projection lens of claim 12 wherein the projection lens has a lateral color aberration which is less than a pixel at the object.

14. The projection lens of claim 12 wherein the maximum clear aperture of the first lens unit is less than 0.7 times the diagonal of the pixelized panel.

15. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the projection lens of claim 1 or 2.

16. The projection lens system of claim 15 wherein the magnification of the system is changed by changing; (i) the distance between the projection lens and the pixelized panel; and (ii) the distance between the first and second lens units.

*17. A projection lens system comprising:*

*(A) a screen;*

*(B) a pixelized panel; and*

*(C) a projection lens for forming a magnified image of the pixelized panel on the screen, said projection lens consisting of:*

*(i) a first lens unit; and*

*(ii) a second lens unit which has a positive power and consists of first and second lens subunits which are separated from one another by an airspace;*

*wherein:*

*(a) the first lens unit comprises a negative lens element which comprises at least one aspherical surface for correction of distortion;*

*(b) the maximum clear aperture of the first lens unit is less than 0.7 times the diagonal of the pixelized panel;*

*(c) the second lens unit provides most of the power of the projection lens;*

*(d) the second lens subunit of the second lens unit comprises at least one aspherical surface for correction of spherical aberration;*

*(e) the projection lens has a half field of view in the direction of the screen of at least 35°; and*

*(f) the total number of lens elements of the projection lens is five or six.*

*18. The projection lens system of claim 17 further comprising a Fresnel lens between the pixelized panel and the projection lens.*

*19. The projection lens system of claim 17 wherein the projection lens has a focal length f0, the first lens unit has a focal length f1, the second lens unit has focal length f2, the first lens subunit of the second lens unit has a focal length $f2_{S1}$, the second lens subunit of the second lens unit has a focal length $f2_{S2}$, and*

$$|f1|/f0 > 0.75;$$
$$f2/f0 < 2.0;$$

-continued $$f2_{S1} > 0;$$
$$f2_{S1}/f0 < 1.5; \text{ and}$$
$$|f2_{S2}|/f0 > 1.5.$$

*20. The projection lens system of claim 17 wherein the second lens subunit of the second lens unit consists in order from its image side of: (a) a negative lens element, (b) a positive lens element, and (c) a plastic lens element having at least one aspherical surface.*

*21. The projection lens system of claim 20 wherein the plastic lens element of the second lens subunit has a positive on-axis power.*

*22. The projection lens system of claim 20 wherein the plastic lens element of the second lens subunit has a negative on-axis power.*

*23. The projection lens system of claim 20 wherein the negative lens element of the second lens subunit has a higher dispersion than the positive lens element of the second lens subunit.*

*24. The projection lens system of claim 17 wherein the projection lens has a focal length f0, the negative lens element of the first lens unit has a focal length $f_{E1}$, and*

$$|f_{E1}|/f0<1.5.$$

*25. The projection lens system of claim 17 wherein the projection lens has a focal length f0, the length of the airspace between first and second lens subunits of the second lens unit is $t_{S1S2}$, and*

$$t_{S1S2}/f0>0.1.$$

*26. The projection lens system of claim 17 wherein the maximum clear aperture of the first lens unit is greater than the maximum clear aperture of the second lens unit.*

*27. The projection lens system of claim 17 wherein the second lens unit has a rear principal point which is located ahead of the image end of the second lens subunit.*

*28. The projection lens system of claim 17 wherein the projection lens has a distortion which is less than one percent at the image.*

*29. The projection lens system of claim 17 wherein the projection lens has a lateral color aberration at the pixelized panel which is less than a pixel.*

*30. The projection lens system of claim 17 wherein the system comprises an illumination system which comprises a light source and illumination optics which forms an image of the light source, said image of the light source being the output of the illumination system.*

*31. The projection lens system of claim 17 wherein the magnification of the system is changed by changing: (i) the distance between the projection lens and the pixelized panel; and (ii) the distance between the first and second lens units.*

*32. The projection lens system of claim 15 further comprising a Fresnel lens between the pixelized panel and the projection lens.*

* * * * *

UNITED STATES PATENT AND TRADEMARK OFFICE

CERTIFICATE OF CORRECTION

PATENT NO. : RE 39,911 E
APPLICATION NO. : 10/720004
DATED : November 6, 2007
INVENTOR(S) : Jacob Moskovich It is certified that error appears in the above-identified patent and that said Letters Patent is hereby corrected as shown below:

Column 4
Line 4, delete "and" and insert -- for --, therefor.
Line 13 (Approx.), delete "$f2_{S1} < 1.5$; and" and insert -- $f2_{S1}/f0 < 1.5$; and --, therefor.

Column 13/14 (Table 3)
Line 6, after "4" insert -- a --.

Column 15-16 (Table 3)
Line 25, below "Space 1" delete "T(4)" and insert -- T(2) --, therefor.
Line 25, below "Space 2" delete "T(13)" and insert -- T(11) --, therefor.

Column 17
Line 17, below "Lens" delete "(FI)" and insert -- (F1) --, therefor.

Column 19
Line 23 (Approx.), in Claim 16, after "changing" delete ";" and insert -- : --, therefor.
Line 57 (Approx.), in Claim 19, after "has" insert -- a --.

Signed and Sealed this

Twenty-fifth Day of March, 2008

JON W. DUDAS
*Director of the United States Patent and Trademark Office*